(12) United States Patent
Moore

(10) Patent No.: US 8,591,214 B2
(45) Date of Patent: Nov. 26, 2013

(54) QUICK HEAT ICE CREAM SCOOP

(76) Inventor: William Moore, Wichita Falls, TX (US)

( * ) Notice: Subject to any disclaimer, the term of this patent is extended or adjusted under 35 U.S.C. 154(b) by 317 days.

(21) Appl. No.: 13/037,472

(22) Filed: Mar. 1, 2011

(65) Prior Publication Data

US 2012/0225153 A1 Sep. 6, 2012

(51) Int. Cl.
*A23G 9/28* (2006.01)
*B29C 67/24* (2006.01)

(52) U.S. Cl.
USPC ............... 425/76; 425/87; 425/276; 425/279

(58) Field of Classification Search
USPC ............ 425/87, 76, 276, 279, DIG. 13, 187, 425/277, 287
See application file for complete search history.

(56) References Cited

U.S. PATENT DOCUMENTS

| | | | | |
|---|---|---|---|---|
| 1,971,577 A | * | 8/1934 | Parker | 425/281 |
| 1,974,051 A | * | 9/1934 | Kelly | 425/281 |
| 2,256,770 A | * | 9/1941 | Armstrong | 425/282 |
| 3,513,290 A | * | 5/1970 | Burley et al. | 219/242 |
| 3,604,597 A | * | 9/1971 | Pohl et al. | 222/146.5 |
| 3,809,520 A | * | 5/1974 | Wilk et al. | 425/276 |
| 3,886,345 A | * | 5/1975 | Baisch | 219/227 |
| 4,005,310 A | * | 1/1977 | Baisch | 219/227 |
| 4,386,900 A | * | 6/1983 | Sultan | 425/279 |
| 4,553,921 A | * | 11/1985 | Lamphere et al. | 425/279 |
| D305,852 S | | 2/1990 | Clement et al. | |
| H846 H | * | 11/1990 | Allen et al. | 425/277 |
| 5,000,672 A | * | 3/1991 | Halimi | 425/279 |
| D320,914 S | * | 10/1991 | Allen | D7/681 |
| 5,131,832 A | * | 7/1992 | Budreau | 425/277 |
| D336,411 S | | 6/1993 | Keech et al. | |
| 5,348,023 A | * | 9/1994 | McLucas | 600/570 |
| D419,039 S | * | 1/2000 | Rimback | D7/681 |
| D419,040 S | * | 1/2000 | Rimback | D7/681 |
| 6,416,309 B1 | * | 7/2002 | Michlitsch et al. | 425/187 |
| D472,111 S | | 3/2003 | Shoup et al. | |
| D490,666 S | | 6/2004 | Gordon | |
| 6,846,171 B2 | * | 1/2005 | Herbert | 425/277 |
| D501,373 S | * | 2/2005 | Allen et al. | D7/681 |
| D519,003 S | * | 4/2006 | Wright | D7/681 |
| 7,205,509 B2 | * | 4/2007 | Goulet | 219/521 |
| 7,427,194 B1 | * | 9/2008 | Lopez | 425/279 |
| D578,840 S | * | 10/2008 | Hansen et al. | D7/681 |
| 7,823,500 B2 | * | 11/2010 | Yeghiayan et al. | 99/286 |

* cited by examiner

*Primary Examiner* — Yogendra Gupta
*Assistant Examiner* — Emmanuel S Luk

(57) ABSTRACT

The quick heat ice cream scoop is an improved heat ice cream scoop that includes a ceramic heating element and an ergonomic grip. The ceramic heating element is built into the ice cream scoop and quickly heats up the ice cream scoop, and conversely shall quickly cool down when turned off. The ice cream scoop is mounted to an ergonomic grip that reduces hand fatigue of the end user while providing a location to store powering means for powering the ceramic heating element.

3 Claims, 3 Drawing Sheets

QUICK HEAT ICE CREAM SCOOP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of heated ice cream scoops, more specifically, an ice cream scoop that includes a quick-heat material to quickly heat-up the ice cream scoop.

B. Discussion of the Prior Art

As will be discussed immediately below, no prior art discloses an ice cream scoop that uses a ceramic heating element to quickly heat up the ice cream scoop in order to scoop frozen ice cream and where after the ceramic heating element quickly cools down so as to prevent unintended overheating of the ice cream as well as to prevent injury to the end user; wherein the ice cream scoop includes an ergonomic handle and powering means to operate the ceramic heating element.

The Clement et al. patent (U.S. Pat. No. Des. 305,852) illustrates an ornamental design for a battery heated ice cream scoop, which does not teach or depict the use of an integrated ceramic heating element.

The Burley et. al. patent (U.S. Pat. No. 3,513,290) discloses an automatically heated ice cream scoop with a stand. However, the automatically heated ice cream scoop does not disclose or teach the use of a ceramic heating element to quickly heat up and thereafter quickly cool down the ice cream scoop.

The Gordon patent (U.S. Pat. No. Des. 490,666) illustrates an ornamental design for a heated ice cream scoop, which does not depict or teach the use of an integrated heating element.

The Keech et al. patent (U.S. Pat. No. Des. 336,411) illustrates an ornamental design for a heated frozen food server, which does not depict or teach the use of an integrated heating element.

While the above-described devices fulfill their respective and particular objects and requirements, they do not describe an ice cream scoop that uses a ceramic heating element to quickly heat up the ice cream scoop in order to scoop frozen ice cream and where after the ceramic heating element quickly cools down so as to prevent unintended overheating of the ice cream as well as to prevent injury to the end user; wherein the ice cream scoop includes an ergonomic handle and powering means to operate the ceramic heating element. In this regard, the quick heat ice cream scoop departs from the conventional concepts and designs of the prior art.

SUMMARY OF THE INVENTION

The quick heat ice cream scoop is an improved heat ice cream scoop that includes a ceramic heating element and an ergonomic grip. The ceramic heating element is built into the ice cream scoop and quickly heats up the ice cream scoop, and conversely shall quickly cool down when turned off. The ice cream scoop is mounted to an ergonomic grip that reduces hand fatigue of the end user while providing a location to store powering means for powering the ceramic heating element.

An object of the invention is to provide an ice cream scoop that can quickly and efficiently heat up in order to aid in scooping frozen ice cream.

A further object of the invention is to provide an ice cream scoop that quickly heats up when the heating element is energized and promptly cools down after de-energizing the heating element so as to not melt ice cream that is located in the scoop immediately after scooping of said ice cream, but prior to placement into a subsequent receptacle.

A further object of the invention is to provide an ergonomic grip that reduces hand fatigue of the end user.

A further object of the invention is to provide a powering means that enables the invention to be highly portable.

These together with additional objects, features and advantages of the quick heat ice cream scoop will be readily apparent to those of ordinary skill in the art upon reading the following detailed description of presently preferred, but nonetheless illustrative, embodiments of the quick heat ice cream scoop when taken in conjunction with the accompanying drawings.

In this respect, before explaining the current embodiments of the quick heat ice cream scoop in detail, it is to be understood that the quick heat ice cream scoop is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the quick heat ice cream scoop.

It is therefore important that the claims be regarded as including such equivalent construction insofar as they do not depart from the spirit and scope of the quick heat ice cream scoop. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description, serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
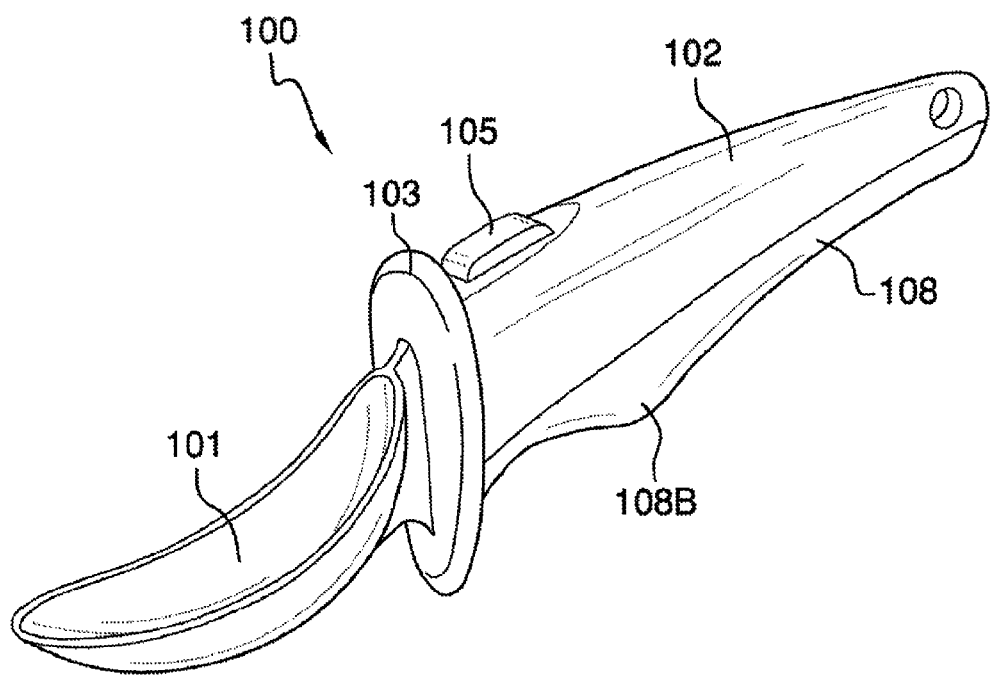
FIG. 1 illustrates an isometric view of the quick heat ice cream scoop by itself.
Figure 2:
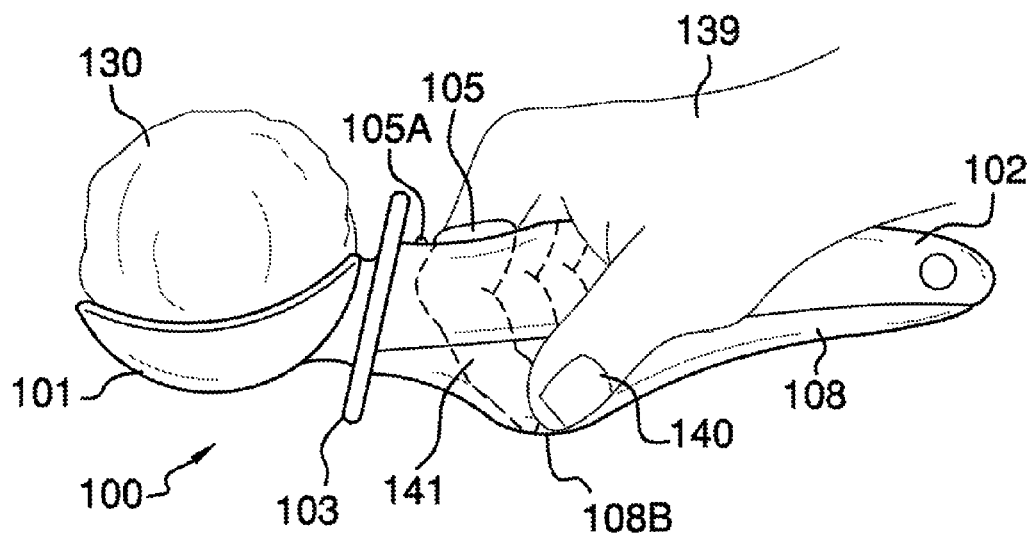
FIG. 2 illustrates a side view of the quick heat ice cream scoop.
Figure 3:
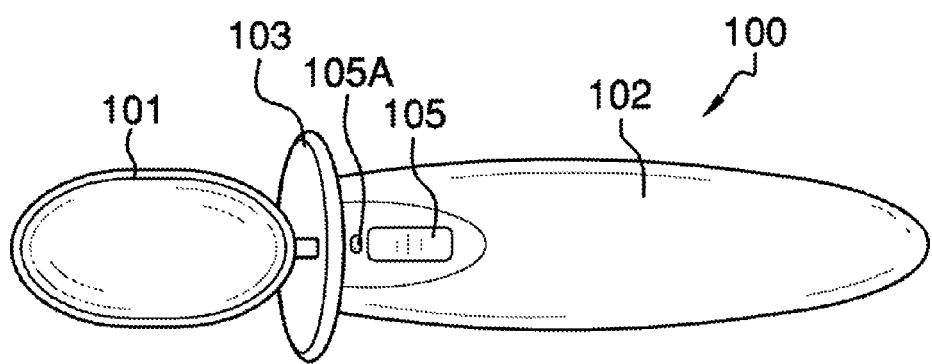
FIG. 3 illustrates a top view of the quick heat ice cream scoop.
Figure 4:
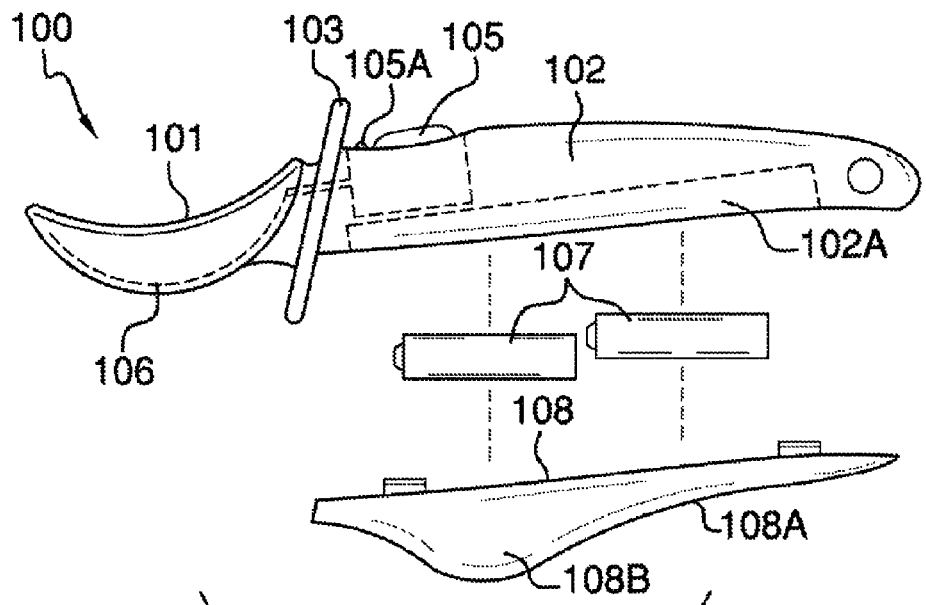
FIG. 4 illustrates a side, exploded view of the quick heat ice cream scoop in which the heating unit and heating element is depicted in broken lines, and the easy grip is separated to reveal batteries used as the powering means.
Figure 5:
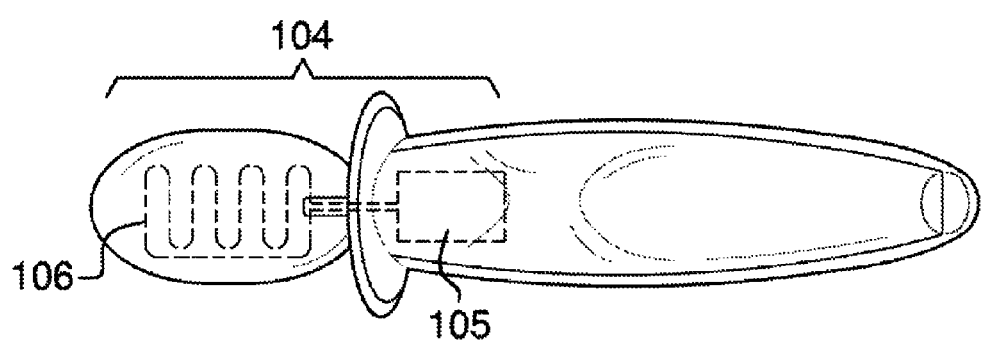
FIG. 5 illustrates a bottom view of the quick heat ice cream scoop in which the ceramic heating element is comprised of a heating unit located in the ergonomic grip that is wiredly connected to heating coils that traverse the ice cream scoop.

Detailed reference will now be made to the preferred embodiment of the present invention, examples of which are illustrated in FIGS. 1-5. A quick heat ice cream scoop 100 (hereinafter invention) includes an ice cream scoop 101 that is affixed to a handle 102. The handle 102 is separated from the ice cream scoop 101 by a shield 103, which prevents hands from slipping onto the ice cream scoop 101 during use.

The ice cream scoop 101 and the handle 102 include a heating means 104, which is comprised of a heating unit 105 and heating coils 106. The heating means 104 is an essential feature of the invention 100 in that it provides a means to quickly heat up and quickly cool down the surface temperature of the ice cream scoop 101. The heating coils 106 traverse down the length of the ice cream scoop 101. It shall be noted that the ice cream scoop 101 encompasses the heating coils 106 such that the heating coils 106 are contained within the ice cream scoop 101. The heating coils 106 are wired to the heating unit 105, which supplies electricity to the heating coils 106. A powering means 107 comprised of at least one battery is used to transmit electricity to the heating unit 105. The powering means 107 are stored within a compartment 102A integrated into the handle 102.

It shall be noted that a light 105A may be included in relative proximity to the heating unit 105, and simply indicates whether or not the heating means 104 is in operation or not. It shall be further noted that it is the responsibility of the end user to turn on and off the heating means 104 between scoops of ice cream 130 provided it is necessary to do so.

The heating unit 106 is essentially an on/off button that is accessible from a top surface of the handle 102. The heating unit 106 directs transmission of electricity from the powering means 107 to the heating coils 106.

The ice cream scoop 101 is made of a ceramic material such that heat generated with the heating coils 106 is transmitted efficiently and quickly through the ice cream scoop 101. The use of a ceramic material in the ice cream scoop 101 insures that heat is transferred quickly to melt ice cream upon insertion of the ice cream scoop 101 into frozen ice cream. Upon forming a scoop of ice cream via the ice cream scoop 101, the heating means 104 shall be turned off to prevent over-melting of the scoop of ice cream 130 formed with the ice cream scoop 101.

The handle 102 is an ergonomic handle and includes an easy grip 108 that attaches to a bottom of the handle 102. The easy grip 108 enables access to the compartment 102A, which stores the powering means 107. The easy grip 108 is further defined by a ridge 108A that extends the length of the easy grip 108. The ridge 108A is further defined by a curved protuberance 108B, which aids in gripping by hand 139 the invention 100 via a thumb 140 and index finger 141.

With respect to the above description, it is to be realized that the optimum dimensional relationship for the various components of the invention 100, to include variations in size, materials, shape, form, function, and the manner of operation, assembly and use, are deemed readily apparent and, obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A quick heat ice cream scoop comprising:
   an ice cream scoop affixed to a handle and separated by a shield;
   wherein both the ice cream scoop and the handle includes a heating means specifically suited to quickly heat up and cool down the ice cream scoop;
   powering means provides electricity to operate the heating means;
   wherein the handle is an ergonomic handle and includes an easy grip that attaches to a bottom of the handle;
   wherein the heating means is further defined by a heating unit and heating coils;
   wherein the heating coils traverse down the length of the ice cream scoop; wherein the ice cream scoop encompasses the heating coils such that the heating coils are contained within the ice cream scoop; wherein the heating coils are wired to the heating unit, which supplies electricity to the heating coils;
   wherein a light is included in relative proximity to the heating unit, and simply indicates whether or not the heating means is in operation or not;
   wherein the heating unit is an on/off button that is accessible from a top surface of the handle;
   wherein the powering means is comprised of at least one battery, which is stored within a compartment integrated into the handle;
   wherein the easy grip enables access to the compartment, which stores the powering means;
   wherein the ice cream scoop is made of a ceramic material such that heat generated with the heating coils is transmitted efficiently and quickly through the ice cream scoop.

2. The quick heat ice cream scoop as described in claim 1 wherein the easy grip is further defined by a ridge that extends the length of the easy grip; wherein the ridge is further defined by a curved protuberance, which aids in gripping by hand the invention via a thumb and index finger.

3. A quick heat ice cream scoop comprising:
   an ice cream scoop affixed to a handle and separated by a shield;
   wherein both the ice cream scoop and the handle includes a heating means specifically suited to quickly heat up and cool down the ice cream scoop;
   powering means provides electricity to operate the heating means, which is stored within a compartment integrated into the handle;
   wherein the handle is an ergonomic handle and includes an easy grip that attaches to a bottom of the handle;

wherein the easy grip enables access to the compartment, which stores the powering means;

wherein the heating means is further defined by a heating unit and heating coils;

wherein a light is included in relative proximity to the heating unit, and simply indicates whether or not the heating means is in operation or not;

wherein the heating coils traverse down the length of the ice cream scoop; wherein the ice cream scoop encompasses the heating coils such that the heating coils are contained within the ice cream scoop; wherein the heating coils are wired to the heating unit, which supplies electricity to the heating coils;

wherein the heating unit is an on/off button that is accessible from a top surface of the handle;

wherein the powering means is comprised of at least one battery;

wherein the ice cream scoop is made of a ceramic material such that heat generated with the heating coils is transmitted efficiently and quickly through the ice cream scoop;

wherein the easy grip is further defined by a ridge that extends the length of the easy grip; wherein the ridge is further defined by a curved protuberance, which aids in gripping by hand the invention via a thumb and index finger.

\* \* \* \* \*